Dec. 2, 1947.  W. F. AUGER  2,431,673
ELECTRIC HEATER FOR FROST SHIELDS
Filed May 23, 1945
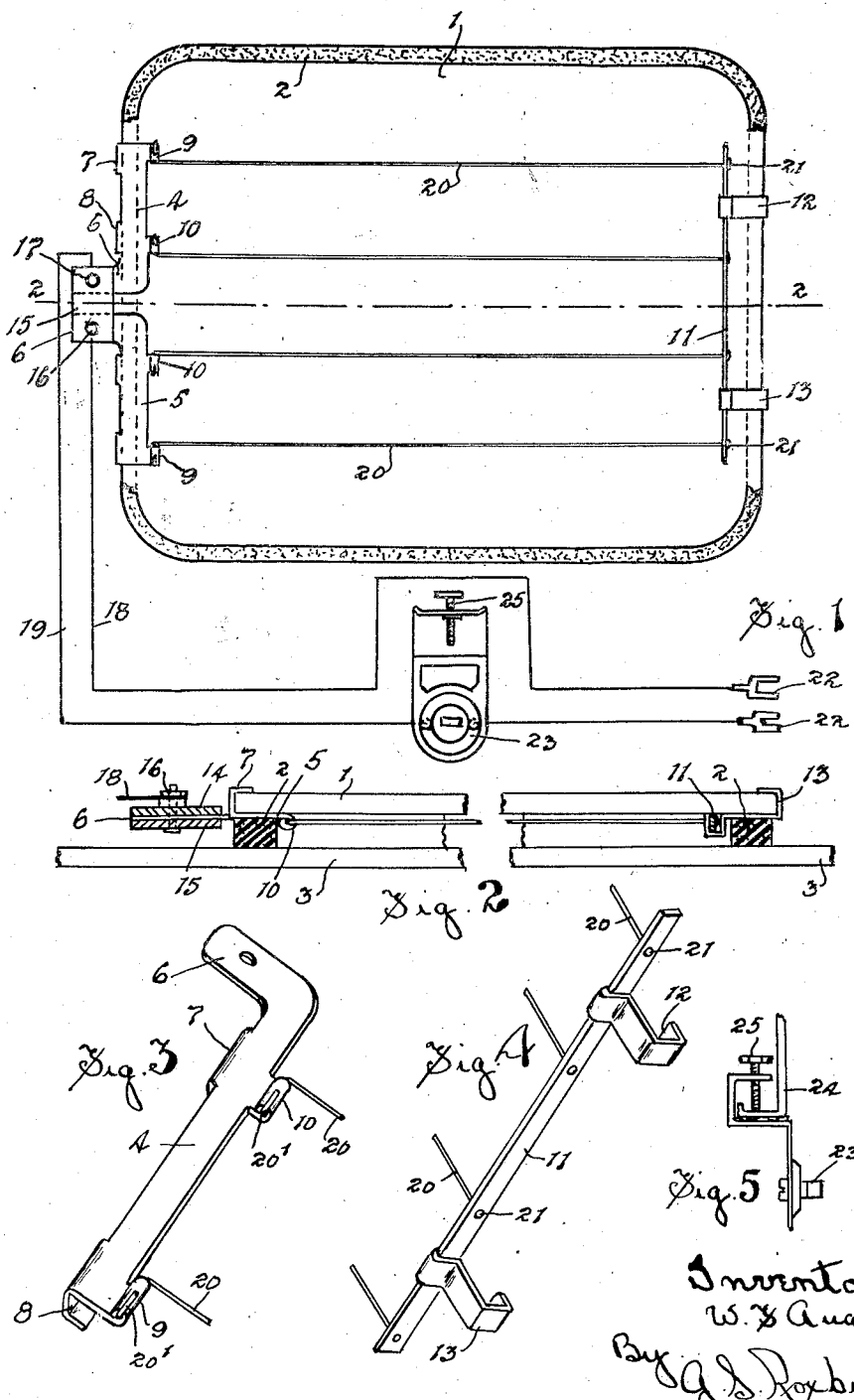
Inventor
W. F. Auger
By J. S. Roxburgh
His Atty Patented Dec. 2, 1947

2,431,673

UNITED STATES PATENT OFFICE 2,431,673

ELECTRIC HEATER FOR FROST SHIELDS

William F. Auger, Winnipeg, Manitoba, Canada

Application May 23, 1945, Serial No. 595,307
In Canada May 23, 1944

1 Claim. (Cl. 219—19)

The invention relates to electric heaters for frost shields and an object of the invention is to provide a heater constructed from relatively few parts which can be manufactured at low cost and easily and readily assembled and quickly applied in working position on the frost shield.

A further object is to provide a heater which clips onto the ends of the transparent plate of the frost shield and which when applied automatically maintains the heating wires of the heater in tension and at the same time insures of the effective retaining of the heater in working position.

A further object is to provide a heater construction which permits of the easy and quick adjustment or replacement of any of the heating wires and which is also so arranged that the electric circuit is controlled by a switch located within convenient range on the automobile dash.

With the above more important objects in view the invention consists essentially in the arrangement and construction of parts hereinafter described, reference being had to the accompanying drawing in which—

Fig. 1 is a face view of the frost shield equipped with my invention certain parts being broken away.

Fig. 2 is an enlarged horizontal sectional view at 2—2 Fig. 1.

Fig. 3 is a perspective view of one of the anchor bars.

Fig. 4 is a perspective view of the spring bar.

Fig. 5 is a side view of the switch as it appears secured to the dash of an automobile.

In the drawing like characters of reference indicate corresponding parts in the several figures.

Frost shields, at present manufactured, are equipped with electric heaters whose functions are well known and require no explanation herein. Such frost shields present a transparent plate 1, such as of glass, which is cut to the required size and is provided with a bordering strip of rubber 2, such as sponge rubber, the said strip being adhesively stuck to the plate. The face of the strip, remote from the plate, is so arranged that it can be easily and quickly secured to the inner face of the well known automobile wind shield 3 or other glass window of the automobile. The rubber strip spaces the plate 1 from that 3 and provides a dead air space between the plates.

In order to equip a frost shield with an electric heater which can be manufactured at low cost and easily and quickly installed and which will operate effectively, I have designed the device herein disclosed and which comprises the parts now described.

A pair of similar anchor bars 4 and 5 are provided, each bar being formed at one end with a lateral extension 6 and being supplied with a pair of spaced, similar side clips 7 and 8 and with a pair of elongated, spaced eyes 9 and 10. The clips and eyes are integrally formed with the bar and the clips are adapted to receive and grip the entered edge of the frost shield plate 1.

A spring bar 11 is also supplied and it has a spaced pair of side clips 12 and 13 attached thereto. The latter clips are formed from metal strips bent at one end to grab the bar and formed at the other end to receive and grip the entered edge of the frost shield plate 1.

The offset or lateral extensions of the bars 4 and 5 are received between similar front and rear insulating plates 14 and 15 and bolts 16 and 17 fasten the latter plates together said bolts passing through the extensions. The bolts form binding posts or terminals for the lead wires 18 and 19.

Similar electric heating wires 20 connect the eyes 9 and 10 to the bar 11. Actually each wire 20 has one and supplied with an enlarged head 21 and it is put in place by threading through a hole provided in the bar 11 and then passing the free end of the wire through the eye of the anchor bar and bending back or tying to prevent escape such as shown at 20' in Fig. 3.

The plates 1 used for frost shields are of predetermined, varying sizes and when one is equipping frost shields with my heaters he will know the particular size of the plate and will choose the assembled heater accordingly. The heater will be selected such that when the ends of the plate 1 are received within the clips 7 and 8 and those 12 and 13, the spring bar is under tension, as clearly shown in Fig. 1. This insured that all clips grip tightly and that the wires 20 are held at all times under tension and clear of the plate 1 which is desirable. After the heater has been applied to the plate 1, one attaches the rubber bordering strip 2 in the usual way and the device is ready for use.

One could of course place the anchor bars and the spring bar in place first, and then tighten up the individual wires 20 to the desired tension as such wires can be readily pulled through the eyes and fastened when the required tension is reached.

The lead wires 18 and 19 are supplied with the well known terminal jaws 22 and a suitable switch 23 is inserted in the line to control the current upon the jaws being connected with a source of current supply. The switch herein shown is suitable for attaching to the dash 24 of an automobile being held in place by a jam screw 25.

What I claim as my invention is:

The combination with the transparent plate of a frost shield, of an electric heater comprising a pair of similar spaced anchor bars extending transversely of one end of the plate and having their adjacent ends formed with similar outstanding extensions and each provided further at its outer edge with clips to receive and grip the plate and at its inner edge with spaced eyes, insulating plates applied on the extensions and secured thereto by terminal bolts, a spring bar crossing the other end of the transparent plate, spaced clips secured to the latter bar and gripping the adjoining edge of the latter plate, and spaced heating wires connecting the spring bar with the anchor bars, said wires being held in tension by the spring bar.

WILLIAM F. AUGER.

REFERENCES CITED

The following references are of record in the file of this patent:

UNITED STATES PATENTS

| Number | Name | Date |
|---|---|---|
| Re. 20,628 | Thorp | Jan. 18, 1938 |
| 1,721,663 | Holzhauer, Jr. | July 23, 1929 |
| 1,945,742 | Hilger | Feb. 6, 1934 |
| 2,195,862 | Janda | Apr. 2, 1940 |
| 2,360,299 | Zaiger | Oct. 10, 1944 |

FOREIGN PATENTS

| Number | Country | Date |
|---|---|---|
| 790,048 | France | Sept. 2, 1935 |